US012706418B2

(12) United States Patent
Huang

(10) Patent No.: US 12,706,418 B2
(45) Date of Patent: Aug. 11, 2026

(54) PLUGGABLE OPTICAL MODULE

(71) Applicant: CLOUD LIGHT TECHNOLOGY LIMITED, Hong Kong (HK)

(72) Inventor: Chieh-Tse Huang, Hong Kong (HK)

(73) Assignee: Lumentum Operations LLC, San Jose, CA (US)

( * ) Notice: Subject to any disclaimer, the term of this patent is extended or adjusted under 35 U.S.C. 154(b) by 397 days.

(21) Appl. No.: 18/349,188

(22) Filed: Jul. 10, 2023

(65) Prior Publication Data

US 2025/0023294 A1 Jan. 16, 2025

(51) Int. Cl.

*H01R 13/629* (2006.01)
*G02B 6/42* (2006.01)
*H01R 4/64* (2006.01)
*H01R 13/627* (2006.01)

(52) U.S. Cl.

CPC ......... *H01R 13/629* (2013.01); *G02B 6/4269* (2013.01); *G02B 6/4278* (2013.01); *H01R 4/64* (2013.01); *H01R 13/6275* (2013.01)

(58) Field of Classification Search

None
See application file for complete search history.

(56) References Cited

U.S. PATENT DOCUMENTS 6,857,788 B1 2/2005 Dugas
9,354,405 B2 * 5/2016 Yeh ...................... G02B 6/4228
10,795,100 B2 10/2020 Leigh et al.
2015/0079832 A1 * 3/2015 Gordon ................ H01R 43/205 29/842
2019/0045650 A1 * 2/2019 Leigh ................... H05K 7/1061
2019/0245287 A1 * 8/2019 Su ........................ H01R 13/502
2021/0263240 A1 8/2021 Tseng
2022/0190921 A1 6/2022 Chen et al.
2025/0219308 A1 * 7/2025 Li ...................... H01R 12/7005

FOREIGN PATENT DOCUMENTS

| | | | |
|---|---|---|---|
| CN | 1641938 | A | 7/2005 |
| CN | 1836181 | A | 9/2006 |
| CN | 110248514 | A | 9/2019 |
| CN | 220085122 | U | 11/2023 |
| TW | 202132843 | A | 9/2021 |
| TW | M645384 | U | 8/2023 |

* cited by examiner

*Primary Examiner* — Oscar C Jimenez
(74) *Attorney, Agent, or Firm* — Harrity & Harrity, LLP

(57) ABSTRACT

A pluggable optical module includes a socket interface, a frame, two guide members, and a plug. The frame surrounds the socket interface and is provided with an engagement slot at each side. The two guide members are disposed parallel to each other at the two sides of the frame and define an opening. The two guide members each include a guide rail piece, an elastic arm, and a locking piece. The guide rail piece is provided with a guide rail towards the socket interface, the elastic arm has an elastic structure, the locking piece is connected to the elastic arm and located corresponding to the engagement slot. The parallel two sides of the plug respectively have a feature corresponding to the guide rail, so that the plug may slide relative to the guide rail piece to connect to the socket interface or away from the socket interface.

18 Claims, 8 Drawing Sheets

PLUGGABLE OPTICAL MODULE

BACKGROUND OF THE INVENTION

1. Field of the Invention

The present disclosure relates to an optical module, and more particularly to a pluggable optical module.

2. Description of the Related Art

When a plug of a photoelectric conversion module is to be connected to a circuit board, sufficient vertical space is required for assembly. This will lead to a reduction in the number of photoelectric conversion modules that can be assembled and accommodated in a unit space, which is not conducive to the miniaturization of equipment. In addition, the plug of the photoelectric conversion module is usually fixed, if it is used as an optical pluggable form (can be separated from the socket on the circuit board), it will reduce the protection effect of the optical module against moisture and dust particles.

BRIEF SUMMARY OF THE INVENTION

Therefore, in order to solve various problems of the traditional optical module, the present disclosure provides a pluggable optical module.

In order to achieve the above objectives and more, the present disclosure provides a pluggable optical module, which includes a socket interface, a frame surrounding the socket interface, the frame is provided with an engagement slot at each side, two guide members disposed parallel to each other at the two sides of the frame. The two guide members can define an opening, a first end of each of the two guide members is fixed to the frame, the first end is opposite to the opening, the two guide members each include a guide rail piece, an elastic arm, and a locking piece. The guide rail piece is provided with a guide rail towards the socket interface, the elastic arm has an elastic structure, the locking piece is connected to the elastic arm and located corresponding to the engagement slot. A plug is provided, the parallel two sides of the plug respectively have a feature corresponding to the guide rail, so that the plug may slide relative to the guide rail piece to connect to the socket interface or away from the socket interface. When the locking piece and the engagement slot interfere with each other, the locking piece limits a movement of the plug, when the mutual interference of the locking piece and the engagement slot is released, the movement of the plug is not limited by the locking piece.

In an embodiment of the present disclosure, the plug has at least one pedestal, disposed on a connection surface of the plug and the socket interface, the socket interface is provided with at least one first positioning hole located corresponding to the pedestal.

In an embodiment of the present disclosure, the locking piece includes a fulcrum part, a fastening part, and a pulling part. The fulcrum part abuts against the guide rail piece facing the outside, and the fastening part is located corresponding to the engagement slot. The pulling part is located at the opening, the fastening part and the pulling part are connected to two ends of the fulcrum part.

In an embodiment of the present disclosure, the pluggable optical module further includes a circuit board and a reinforced backplane. The socket interface and the reinforcing backplane are respectively disposed on opposite two sides of the circuit board. The reinforcing backplane is provided with at least one positioning boss running through the circuit board. The socket interface is provided with at least one second positioning hole located corresponding to the positioning boss.

In an embodiment of the present disclosure, the plug has at least one pedestal, disposed on a connection surface of the plug and the socket interface. The socket interface is provided with at least one first positioning hole located corresponding to the pedestal. The first positioning hole and the second positioning hole communicate with each other to form a through hole.

In an embodiment of the present disclosure, the pluggable optical module further includes a transverse connecting arm, connecting the first end of each of the two guide members.

In an embodiment of the present disclosure, the plug has an annular groove, disposed around the connection surface of the plug and the socket interface.

In an embodiment of the present disclosure, a surface of the plug is provided with a heat dissipation fin.

Accordingly, the pluggable optical module of the present disclosure is assembled by a side of the circuit board, plugging and unplugging the plug, so only a very small assembling space is required. A large number of pluggable optical modules can be stacked in a small space, maximizing space utilization and increasing the convenience of maintenance and repair. Further, since the plug of the pluggable optical module of the present disclosure directly covers the socket interface and is limited by the locking piece, the socket interface can be stably sealed and prevent interference of external moisture and dust particles, and improve protection capabilities of the pluggable optical module against water and dust.

DETAILED DESCRIPTION OF THE INVENTION

Figure 1:
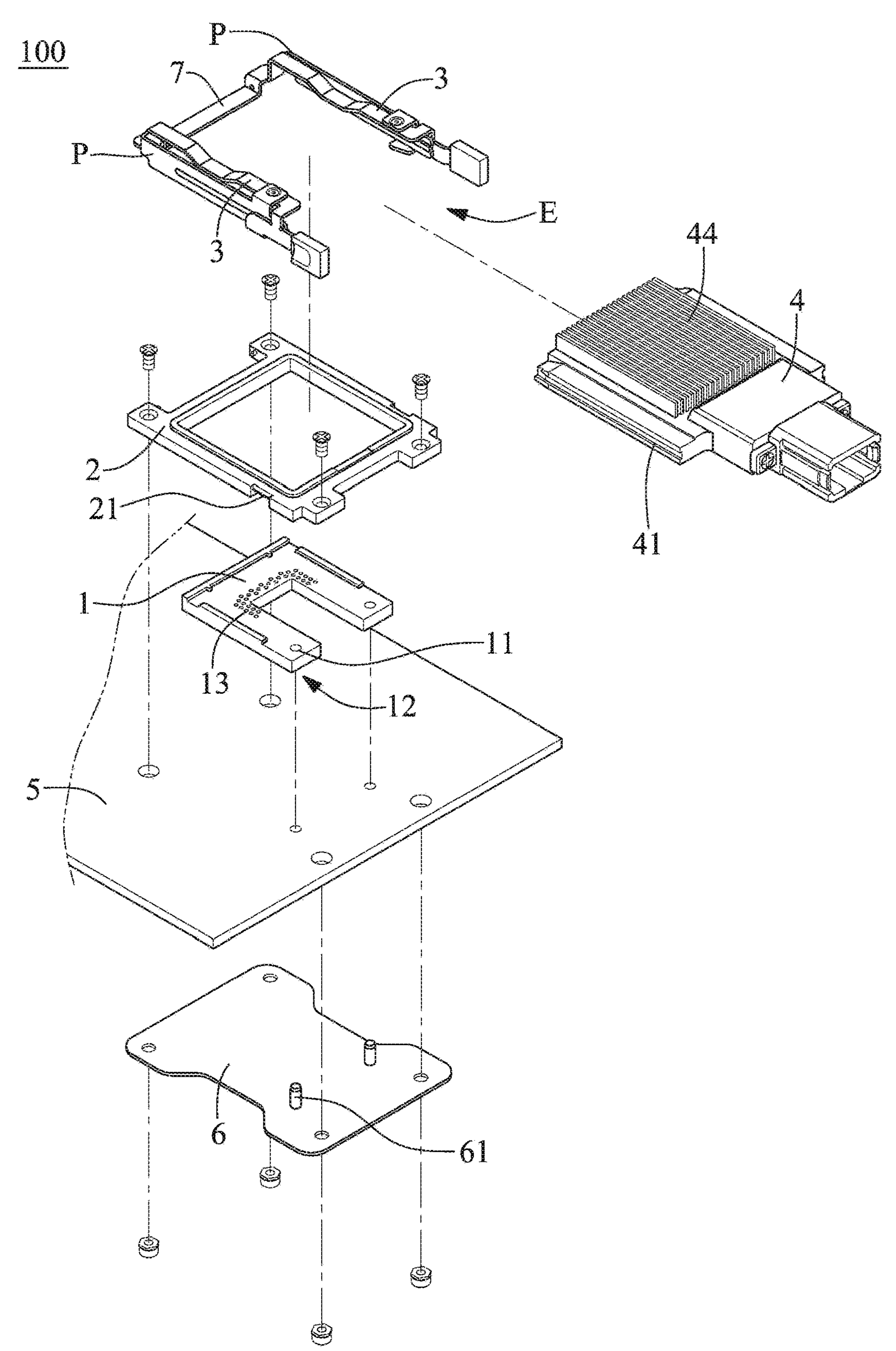
FIG. 1 is an exploded view of a pluggable optical module according to an embodiment of the present disclosure.
Figure 2:
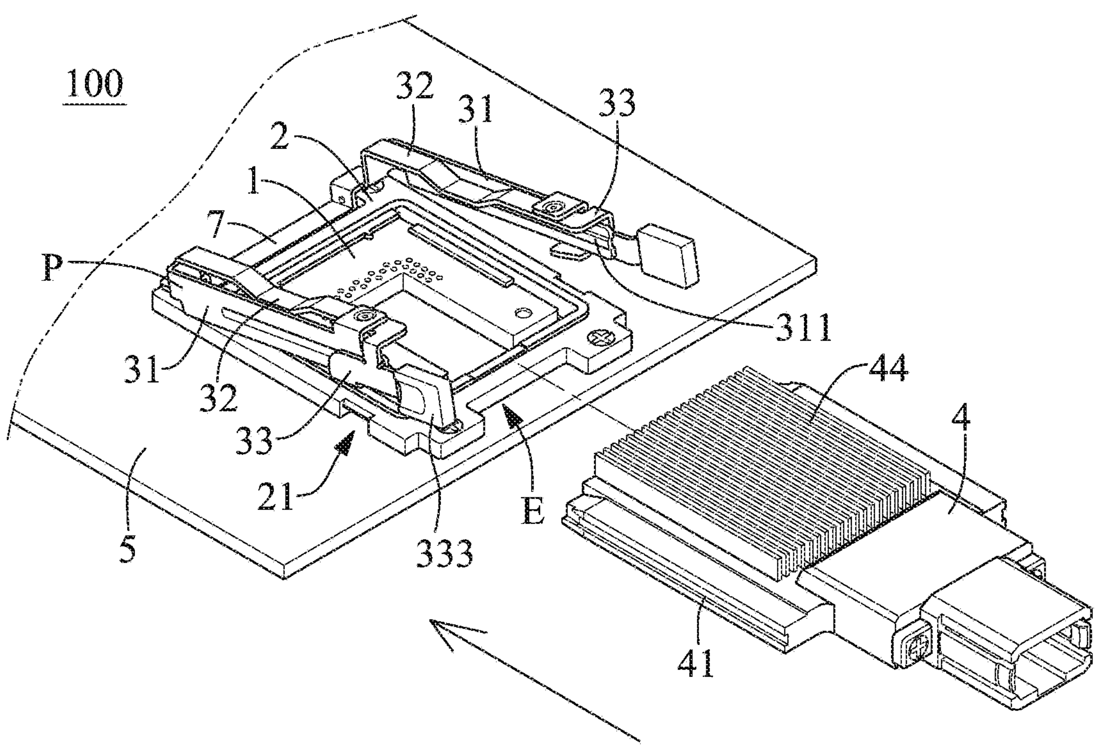
FIG. 2 is a schematic assembling view of the pluggable optical module according to an embodiment of the present disclosure.
Figure 3:
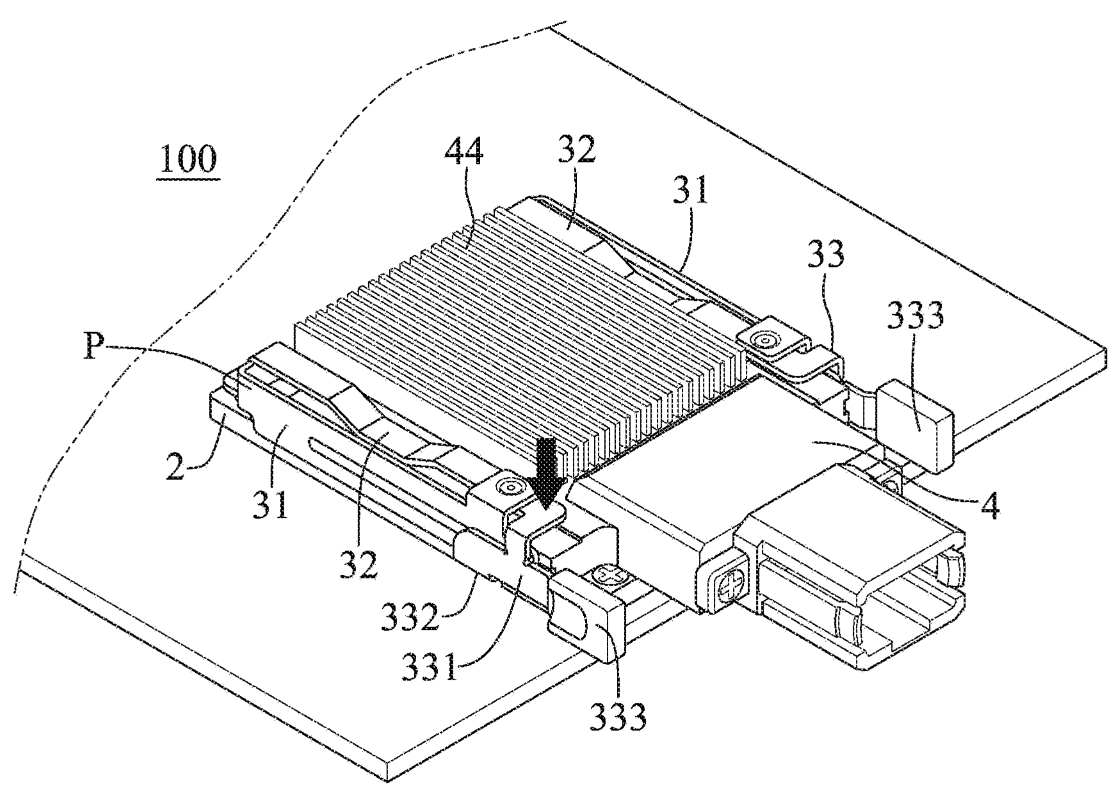
FIG. 3 is a schematic perspective view of the pluggable optical module according to an embodiment of the present disclosure.

To facilitate understanding of the present disclosure, specific embodiments together with the attached drawings for the detailed description of the present disclosure are provided. One skilled in the art may understand objectives, characteristics, and effects of the present disclosure by the contents disclosed in the specification. It should be noted that the present disclosure may also be implemented or applied by other embodiments, and the details in the specification may also be modified and varied based on different views and applications without departing from the spirit of the present disclosure. The following embodiments will further elaborate the relevant technical content of the present disclosure, but the disclosed content is not intended to limit the claims of the present disclosure. The description is as follows:

As shown in FIGS. 1 to 3, a pluggable optical module 100 of an embodiment of the present disclosure, comprises a socket interface 1, a frame 2, two guide members 3, and a plug 4.

The socket interface 1 is provided on a circuit board 5 and electrically connected to the circuit board 5. The socket interface 1 may be provided with a plurality of contacts 13 to electrically connect with the plug 4. In detail, the socket interface 1 is a C-shaped recess, and the recess accommodates a photoelectric conversion module in the plug 4. The plug 4 includes an optical fiber port and an electrical port, and there is a printed circuit board at the end of the electrical port, and the printed circuit board includes the photoelectric conversion module and electrical signal contacts thereon. The other end of the photoelectric conversion module is connected to the optical fiber port. The electrical signal contacts on the plug 4 are set on the same side as the photoelectric conversion module, which can shorten the connection distance of the electrical signal and improve the quality of signal transmission.

The frame 2 surrounds the socket interface 1, the frame 2 is rectangular in the present embodiment, however, the present disclosure is not limited thereto. The frame 2 is provided with an engagement slot 21 at each side.

Figure 4:
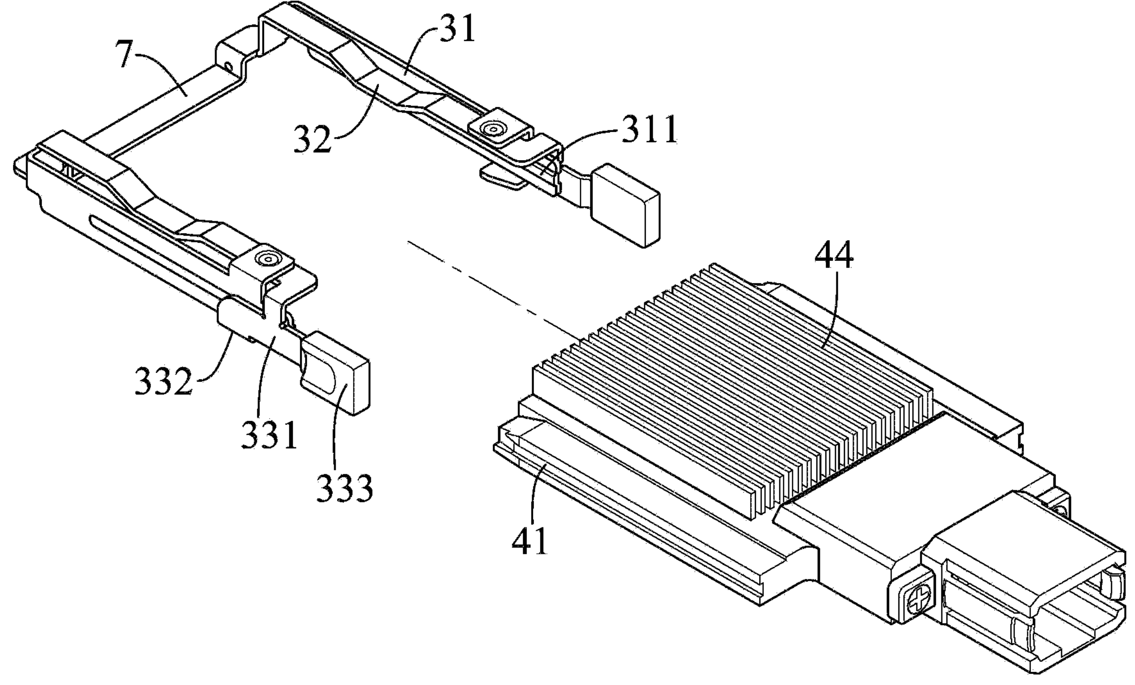
FIG. 4 is a schematic perspective view of guide members and a plug according to an embodiment of the present disclosure.
Figure 5:
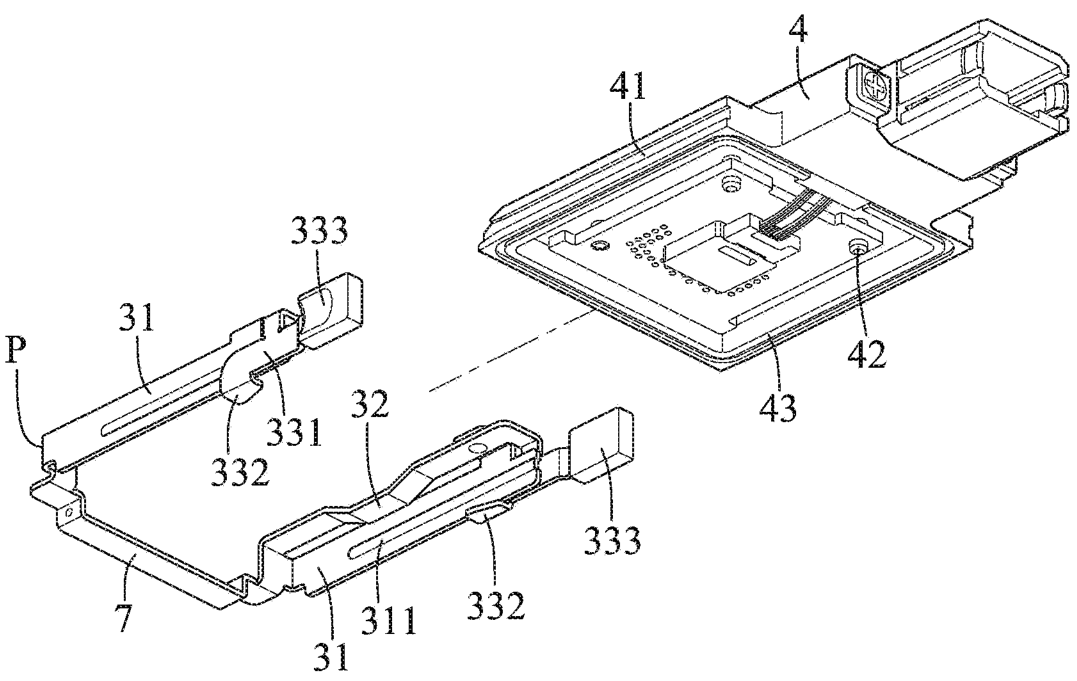
FIG. 5 is a schematic view of another angle of FIG. 4.

The two guide members 3 are disposed parallel to each other at the two sides of the frame 2 (i.e., the two sides that are respectively provided with the engagement slot 21). An opening E can be defined by the two guide members 3, the opening E is used for the plug 4 to be inserted from the outside (referring to FIG. 2). A first end P of each of the two guide members 3 is fixed to the frame 2, wherein the first end P is an end of the guide member 3 opposite to the opening E. The two guide members 3 each include a guide rail piece 31, an elastic arm 32, and a locking piece 33. Referring to FIGS. 4 and 5, the guide rail piece 31 is provided with a guide rail 311 towards the socket interface 1, the elastic arm 32 has an elastic structure to store an elastic force, the locking piece 33 is connected to the elastic arm 32 and located corresponding to the engagement slot 21.

The parallel two sides of the plug 4 respectively have a feature 41 corresponding to the guide rail 311 (the other side is omitted from the figure), so that the plug 4 may slide relative to the guide rail piece 31 to connect to the socket interface 1 or away from the socket interface 1.

Next, the pluggable optical module 100 of the present disclosure is described how to perform assembly and how to achieve pluggability (separate the socket interface 1 and the plug 4).

First, according to an exploded view of FIG. 1, the socket interface 1 and the frame 2 are first assembled on the circuit board 5, and the two guide members 3 are fixed to the frame 2 by the respective first ends P (e.g., by screw locking), which is shown in FIG. 2. At this time, the guide member 3 has only one end connected to the frame 2, and the other end (near the end of the opening E) can move freely.

Then, the features 41 on the two sides of the plug 4 are aligned with the two guide rails 311, the plug 4 is pushed to a fixed point, and then as shown in FIG. 3, the locking piece 33 is pressed downwards, the locking piece 33 is deformed with the guidance of a chamfer on the frame 2, and finally falls in the engagement slot 21 and mutually interferes with the engagement slot 21, at this time the locking piece 33 limits a movement of the plug 4, so that the plug 4 can be stably connected to the socket interface 1.

Conversely, when the mutual interference of the locking piece 33 and the engagement slot 21 is released, the movement of the plug 4 is not limited by the locking piece, and thus can be ejected by the socket interface 1 from the opening E, that is, returning to the state of FIG. 2.

In the present embodiment, as shown in FIG. 5, the plug 4 has at least one pedestal 42, disposed on a connection surface of the plug 4 and the socket interface 1, the socket interface 1 is provided with at least one first positioning hole 11 located corresponding to the pedestal 42 (as shown in FIG. 1 and FIG. 2). The number of the first positioning holes 11 is not less than the number of the pedestals 42. Because of the presence of the pedestals 42, in FIG. 2, the plug 4 is engaged with the guide rail piece 31 in a slightly inclined manner rather than completely parallel to the plane of the circuit board 5, when the plug 4 is pushed to the fixed point, the position of the pedestal 42 corresponds to the first positioning hole 11. At this time, the locking piece 33 is pressed downwards, the pedestal 42 is conveniently inserted into the first positioning hole 11, and in addition to interfering with the engagement slot 21, the locking piece 33 also forces the plug 4 not to move up, and the pedestal 42 must be moved up to disengage from the first positioning hole 11. In this way, the plug 4 is locked by the locking piece 33. When the mutual interference of the locking piece 33 and the engagement slot 21 is released, the elastic force accumulated by the elastic arm 32 makes the guide member 3 bounce upward, so that the plug 4 has a sufficient activity margin to allow the pedestal 42 to disengage from the first positioning hole 11, at this time, the plug 4 may be ejected from the socket interface 1 along the guide rail 311.

The above embodiment is one of the moving modes of the locking piece 33 limiting the plug 4, however, the present disclosure is not limited thereto. The structures of the locking piece 33 and the plug 4 may be adjusted, so that the plug 4 can be limited by the locking piece 33. In addition, the types of the locking piece 33 and the engagement slot 21 are not limited to the shapes of the hook and groove shown in the figure, and the specific shape thereof may be modified as needed.

Figure 7:
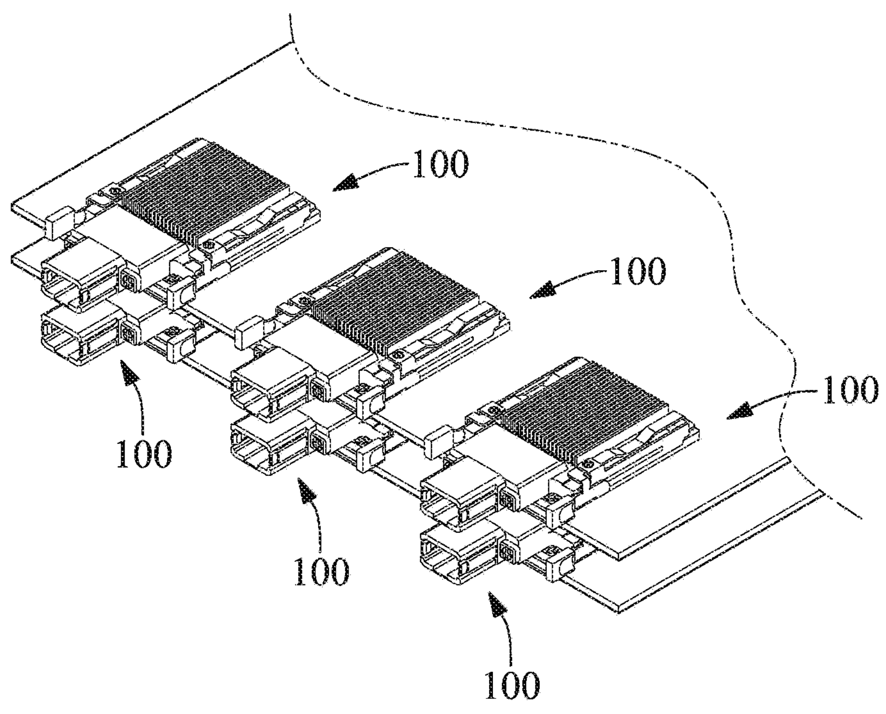
FIG. 7 is a schematic perspective view of the stacked pluggable optical modules according to an embodiment of the present disclosure.

In summary, since the pluggable optical module 100 of the present disclosure is assembled by a side of the circuit board 5, plugging and unplugging the plug 4, only a very small assembling space is required. As shown in FIG. 7, a large number of pluggable optical modules 100 of the present disclosure can be stacked in a small space, maximizing space utilization. Further, since the plug 4 of the pluggable optical module 100 of the present disclosure directly covers the socket interface 1 and is limited by the locking piece 33, the socket interface 1 can be stably sealed and prevent interference of external moisture and dust particles, and improve protection capabilities of the pluggable optical module 100 against water and dust.

Further, in the present embodiment, as shown in FIGS. 2 to 5, the two ends of the elastic arm 32 are connected to the guide rail piece 31. That is, the elastic arm 32 as a whole may be used as an elastic structure to store elastic potential energy, the elastic arm 32 is connected to the guide rail piece 31 at the first end P, and the other end opposite to the first end P (near the end of the opening E) is also connected to the guide rail piece 31. When the elastic arm 32 releases the elastic potential energy and bounces upward with the first end P as a rotating pivot, the guide rail piece 31 is driven together and the plug 4 can be indirectly driven, so that the pedestal 42 of the plug 4 is disengaged from the first positioning hole 11.

Figure 6A:
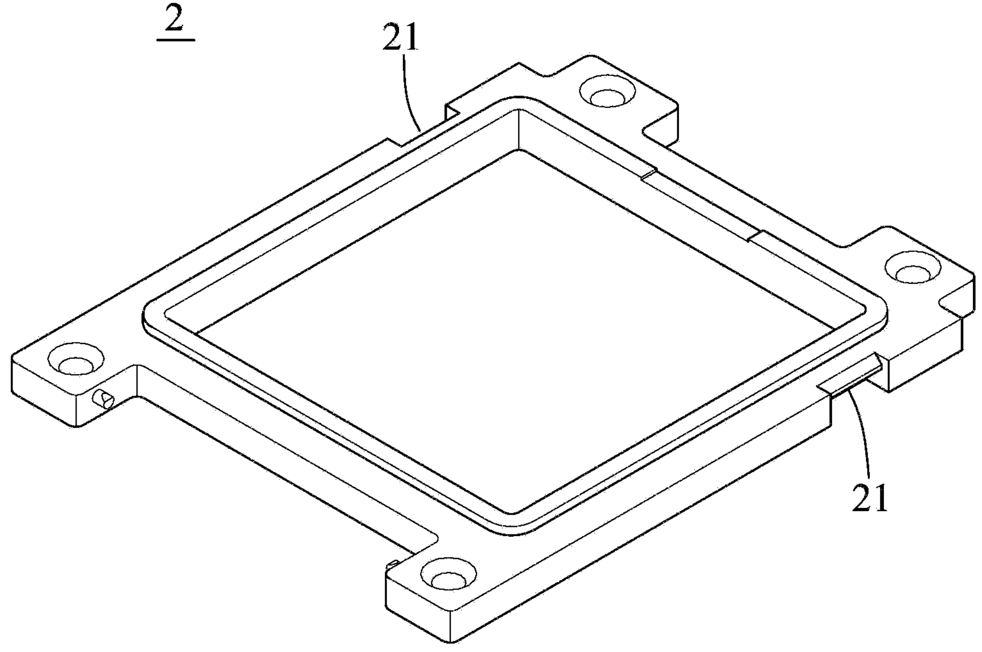
FIG. 6A is a schematic perspective view of a frame according to an embodiment of the present disclosure.
Figure 6B:
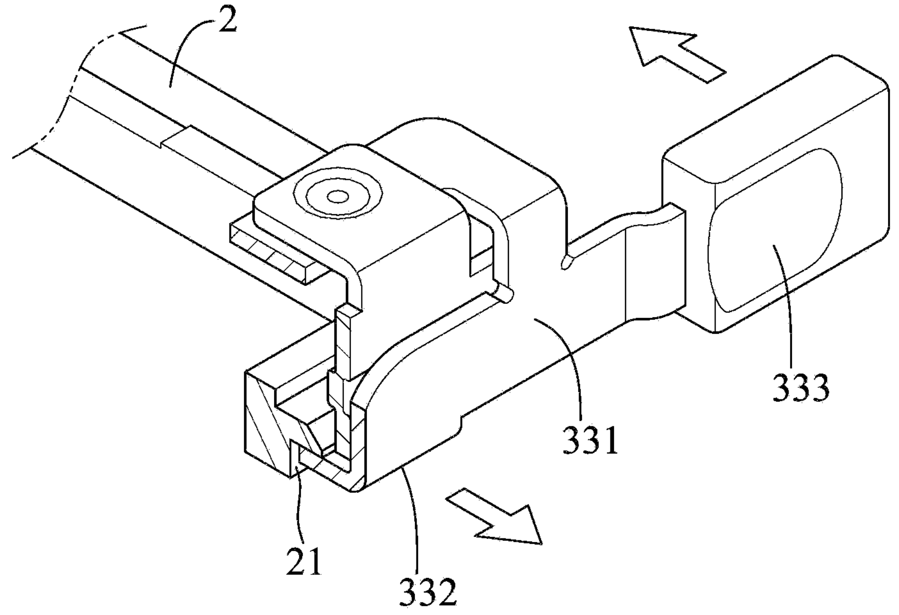
FIG. 6B is a partly schematic sectional view of the frame and a locking piece according to an embodiment of the present disclosure.

Further, in the present embodiment, as shown in FIGS. 3 to 5, the locking piece 33 includes a fulcrum part 331, a fastening part 332, and a pulling part 333. The fulcrum part 331 abuts against the guide rail piece 31 facing the outside, and the fastening part 332 is located corresponding to the engagement slot 21, which is a part actually engaged into the engagement slot 21. The pulling part 333 is located at the opening E, the fastening part 332 and the pulling part 333 are connected to two ends of the fulcrum part 331. The fulcrum part 331, the fastening part 332, and the pulling part 333 may be regarded as a lever, the fulcrum part 331 acts as a fulcrum, the fastening part 332 and the pulling part 333 are two ends of the fulcrum. As shown in FIG. 6B, in the case of mutual interference between the fastening part 332 of the locking part 33 and the engagement slot 21, the user may pull the pulling part 333 inward as shown by the arrow, then the fastening part 332 moves outward, thereby temporarily disengaging from the mutual interference with the engagement slot 21. At this time, the elastic arm 32 releases the accumulated elastic potential energy and bounces upward, driving the fastening part 332 to release the mutual interference with the engagement slot 21 (as shown in FIG. 2).

Further, in the present embodiment, as shown in FIG. 1, the pluggable optical module 100 further includes the aforementioned circuit board 5 and a reinforced backplane 6, the reinforced backplane 6 has a higher structural strength than the flexible circuit board 5 (which is typically a printed circuit board). The socket interface 1 and the reinforcing backplane 6 are respectively disposed on opposite two sides of the circuit board 5, the reinforcing backplane 6 is provided with at least one positioning boss 61 running through the circuit board 5. The socket interface 1 is provided with at least one second positioning hole 12 located corresponding to the positioning boss 61, the number of the second positioning holes 12 is not less than the number of the positioning bosses 61. The reinforced backplane 6 may assist the socket interface 1 to position on the circuit board 5.

For convenience, further, in the present embodiment, the first positioning hole 11 and the second positioning hole 12 communicate with each other to form a through hole. The upper part of through hole is the first positioning hole 11 for the positioning of the pedestal 42 of the plug 4. The lower part of the through hole is the second positioning hole 12 for the socket interface 1 to position on the circuit board 5.

Further, in the present embodiment, as shown in FIG. 1, the pluggable optical module 100 further includes a transverse connecting arm 7, connecting the first end P of each of the two guide members 3 to facilitate assembly.

Further, in the present embodiment, as shown in FIG. 5, the plug 4 has an annular groove 43, disposed around the connection surface of the plug 4 and the socket interface 1. The annular groove 43 can accommodate a sealant strip to further enhance the protection capability of the pluggable optical module 100 against water and dust.

Further, in the present embodiment, a surface of the plug 4 is provided with a heat dissipation fin 44. The heat dissipation fin 44 has a high surface area for heat dissipation of the pluggable optical module 100.

While the present invention has been described by means of specific embodiments, those skilled in the art should understand the above description is merely embodiments of the invention, and it should not be considered to limit the scope of the invention. It should be noted that all changes and substitutions which come within the meaning and range of equivalency of the embodiments are intended to be embraced in the scope of the invention. Therefore, the scope of the invention is defined by the claims.

What is claimed is:

1. A pluggable optical module, comprising:

a socket interface;

a frame, surrounding the socket interface, the frame is provided with an engagement slot at each of two sides of the frame;

two guide members, disposed parallel to each other at the two sides of the frame, the two guide members define an opening, a first end of each of the two guide members is fixed to the frame, the first end is opposite to the opening, the two guide members each comprise a guide rail piece, an elastic arm, and a locking piece, the guide rail piece is provided with a guide rail towards the socket interface, the elastic arm has an elastic structure, the locking piece is connected to the elastic arm and located corresponding to the engagement slot; and a plug comprising two parallel sides, the two parallel sides of the plug respectively have a feature corresponding to the guide rail, so that the plug can slide relative to the guide rail piece to connect to the socket interface or away from the socket interface, wherein the plug has at least one pedestal, disposed on a connection surface of the plug and the socket interface, and the socket interface is provided with at least one first positioning hole located corresponding to the pedestal, wherein when the locking piece and the engagement slot interfere with each other, the locking piece limits a movement of the plug, and wherein, when a mutual interference of the locking piece and the engagement slot is released, the movement of the plug is not limited by the locking piece.

2. The pluggable optical module according to claim 1, wherein the locking piece comprises a fulcrum part, a fastening part, and a pulling part, the fulcrum part abuts against the guide rail piece facing outside, and the fastening part is located corresponding to the engagement slot, the pulling part is located at the opening, the fastening part and the pulling part are connected to two ends of the fulcrum part.

3. The pluggable optical module according to claim 1, further comprising a circuit board and a reinforced backplane, the socket interface and the reinforcing backplane are respectively disposed on opposite two sides of the circuit board, the reinforcing backplane is provided with at least one positioning boss running through the circuit board, the socket interface is provided with at least one second positioning hole located corresponding to the positioning boss.

4. The pluggable optical module according to claim 3, wherein the plug has at least one pedestal, disposed on a connection surface of the plug and the socket interface, the socket interface is provided with at least one first positioning hole located corresponding to the pedestal, the first positioning hole and the second positioning hole communicate with each other to form a through hole.

5. The pluggable optical module according to claim 1, further comprising a transverse connecting arm, connecting the first end of each of the two guide members.

6. The pluggable optical module according to claim 1, wherein the plug has an annular groove, disposed around a connection surface of the plug and the socket interface.

7. The pluggable optical module according to claim 1, wherein a surface of the plug is provided with a heat dissipation fin.

8. A pluggable optical module, comprising:
- a socket interface;
- a frame, surrounding the socket interface, the frame is provided with an engagement slot at each of two sides of the frame;
- two guide members, disposed parallel to each other at the two sides of the frame, the two guide members define an opening, a first end of each of the two guide members is fixed to the frame, the first end is opposite to the opening, the two guide members each comprise a guide rail piece, an elastic arm, and a locking piece, the guide rail piece is provided with a guide rail towards the socket interface, the elastic arm has an elastic structure, the locking piece is connected to the elastic arm and located corresponding to the engagement slot; and
- a plug comprising two parallel sides, the two parallel sides of the plug respectively have a feature corresponding to the guide rail, so that the plug can slide relative to the guide rail piece to connect to the socket interface or away from the socket interface,
  - wherein when the locking piece and the engagement slot interfere with each other, the locking piece limits a movement of the plug,
  - wherein the locking piece comprises a fulcrum part, a fastening part, and a pulling part, the fulcrum part abuts against the guide rail piece facing outside, and the fastening part is located corresponding to the engagement slot, the pulling part is located at the opening, the fastening part and the pulling part are connected to two ends of the fulcrum part, and
  - wherein, when a mutual interference of the locking piece and the engagement slot is released, the movement of the plug is not limited by the locking piece.

9. The pluggable optical module according to claim 8, further comprising a circuit board and a reinforced backplane, the socket interface and the reinforcing backplane are respectively disposed on opposite two sides of the circuit board, the reinforcing backplane is provided with at least one positioning boss running through the circuit board, the socket interface is provided with at least one second positioning hole located corresponding to the positioning boss.

10. The pluggable optical module according to claim 9, wherein the plug has at least one pedestal, disposed on a connection surface of the plug and the socket interface, the socket interface is provided with at least one first positioning hole located corresponding to the pedestal, the first positioning hole and the second positioning hole communicate with each other to form a through hole.

11. The pluggable optical module according to claim 8, further comprising a transverse connecting arm, connecting the first end of each of the two guide members.

12. The pluggable optical module according to claim 8, wherein the plug has an annular groove, disposed around a connection surface of the plug and the socket interface.

13. The pluggable optical module according to claim 8, wherein a surface of the plug is provided with a heat dissipation fin.

14. A pluggable optical module, comprising:
- a socket interface;
- a frame, surrounding the socket interface, the frame is provided with an engagement slot at each of two sides of the frame;
- two guide members, disposed parallel to each other at the two sides of the frame, the two guide members define an opening, a first end of each of the two guide members is fixed to the frame, the first end is opposite to the opening, the two guide members each comprise a guide rail piece, an elastic arm, and a locking piece, the guide rail piece is provided with a guide rail towards the socket interface, the elastic arm has an elastic structure, the locking piece is connected to the elastic arm and located corresponding to the engagement slot; and
- a plug comprising two parallel sides, the two parallel sides of the plug respectively have a feature corresponding to the guide rail, so that the plug can slide relative to the guide rail piece to connect to the socket interface or away from the socket interface;
- a circuit board; and
- a reinforced backplane,
  - wherein the socket interface and the reinforcing backplane are respectively disposed on opposite two sides of the circuit board, the reinforcing backplane is provided with at least one positioning boss running through the circuit board, and the socket interface is provided with at least one second positioning hole located corresponding to the positioning boss,
  - wherein when the locking piece and the engagement slot interfere with each other, the locking piece limits a movement of the plug, and
  - wherein, when a mutual interference of the locking piece and the engagement slot is released, the movement of the plug is not limited by the locking piece.

15. The pluggable optical module according to claim 14, wherein the plug has at least one pedestal, disposed on a connection surface of the plug and the socket interface, the socket interface is provided with at least one first positioning hole located corresponding to the pedestal, the first positioning hole and the second positioning hole communicate with each other to form a through hole.

16. The pluggable optical module according to claim 14, further comprising a transverse connecting arm, connecting the first end of each of the two guide members.

17. The pluggable optical module according to claim 14, wherein the plug has an annular groove, disposed around a connection surface of the plug and the socket interface.

18. The pluggable optical module according to claim 14, wherein a surface of the plug is provided with a heat dissipation fin.

* * * * *